United States Patent
Sang et al.

(10) Patent No.: US 10,568,004 B2
(45) Date of Patent: Feb. 18, 2020

(54) LAYER 2 (L2) MOBILITY FOR NEW RADIO (NR) NETWORKS

(71) Applicant: Futurewei Technologies, Inc., Plano, TX (US)

(72) Inventors: Aimin Justin Sang, San Diego, CA (US); Xuelong Wang, Beijing (CN); Guorong Li, Beijing (CN); Johan C. Qvarfordt, Stockholm (SE); Hongcheng Zhuang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/836,640

(22) Filed: Dec. 8, 2017

(65) Prior Publication Data

US 2018/0279182 A1 Sep. 27, 2018

Related U.S. Application Data

(60) Provisional application No. 62/475,339, filed on Mar. 23, 2017.

(51) Int. Cl.
*H04W 36/00* (2009.01)
*H04L 5/00* (2006.01)
(Continued)

(52) U.S. Cl.
CPC ....... *H04W 36/0055* (2013.01); *H04L 5/0048* (2013.01); *H04W 74/0833* (2013.01); *H04W 56/0015* (2013.01)

(58) Field of Classification Search
CPC .............. H04W 56/0015; H04W 74/0833
See application file for complete search history.

(56) References Cited

U.S. PATENT DOCUMENTS

2006/0245394 A1  11/2006 Baba et al.
2007/0183366 A1*  8/2007 Park ................ H04L 12/66
                                                370/331
(Continued)

FOREIGN PATENT DOCUMENTS

CN      101854732 A    10/2010
WO      2011150396 A1  12/2011

OTHER PUBLICATIONS

Machine Translation and Abstract of Chinese Publication No. CN101854732, Oct. 6, 2010, 11 pages.
(Continued)

*Primary Examiner* — Chi H Pham
*Assistant Examiner* — Fahmida S Chowdhury
(74) *Attorney, Agent, or Firm* — Conley Rose, P.C.

(57) ABSTRACT

A UE comprises: a memory comprising instructions; and one or more processors in communication with the memory, wherein the one or more processors execute the instructions to: wirelessly communicate with a source node, perform a handover from the source node to a target node using L2 signaling in response to a handover decision between the source node and the target node, and wirelessly communicate with the target node in response to the handover. A method implemented by a UE comprises: wirelessly communicating with a source node; performing a handover from the source node to a target node using L2 signaling and in response to a handover decision; and wirelessly communicating with the target node in response to the handover.

21 Claims, 7 Drawing Sheets

(51) Int. Cl.
*H04W 74/08* (2009.01)
*H04W 56/00* (2009.01)

(56) References Cited

U.S. PATENT DOCUMENTS

| | | | | |
|---|---|---|---|---|
| 2009/0124259 A1* | 5/2009 | Attar | ............ | H04L 47/10 |
| | | | | 455/436 |
| 2012/0002643 A1* | 1/2012 | Chung | ............ | H04J 11/0093 |
| | | | | 370/331 |
| 2017/0135001 A1* | 5/2017 | Kim | ............ | H04W 36/0077 |
| 2018/0242268 A1* | 8/2018 | Rune | ............ | H04W 36/08 |

OTHER PUBLICATIONS

Foreign Communication From a Counterpart Application, PCT Application No. PCT/CN2018/079623, English Translation of International Search Report dated May 30, 2018, 5 pages.
Foreign Communication From a Counterpart Application, PCT Application No. PCT/CN2018/079623, English Translation of Written Opinion dated May 30, 2018, 4 pages.
Ericsson, "Conditional Handover," 3GPP TSG-RAN WG2 #97, Tdoc R2-1700864, Athens, Greece, Jan. 13-17, 2017, 5 pages.
Huawei, HiSilicon, "Handover in Single Connectivity Scenario," 3GPP TSG-RAN WG2 #97, R2-1701798, Athens, Greece, Feb. 13-17, 2017, 3 pages.
Huawei, HiSilicon, "Inter-cell Mobility Without RRC Signaling," 3GPP TSG-RAN WG2 #97, R2-1701797, Athens, Greece, Feb. 13-17, 2017, 1 page.
Huawei, HiSilicon, "Measurement and Mobility Considering Beamforming," 3GPP TSG-RAN2 Meeting #97, R2-1701130, Athens, Greece, Feb. 13-17, 2017, 6 pages.
Huawei, HiSilicon, "Overview of Mobility Enhancement for NR," EGPP TSG-RAN WG2#98, R2-1704852, Hangzhou, China, May 15-19, 2017, 7 pages.
Huawei, HiSilicon, et al., "UL-Based Mobility for UEs in Active State," 3GPP TSG-RAN WG2 Adhoc, R2-1700178, Spokane, Washington, USA, Nov. 14-18, 2016, 5 pages.
Nokia, Alcatel-Lucent Shanghai Bell, "On Deriving Cell Quality in NR," 3GPP TSG-RAN WG2 NR #97, R2-1701572, Athens, Greece, Feb. 13-17, 2017, 3 pages.
Sang, "A System and Method for User Equipment Beaconing and Beam Alignment," U.S. Appl. No. 62/374,668, filed Aug. 12, 2016, 51 pages.
Sang, "Hybrid Mobility and Radio Resource Management Mechanisms," U.S. Appl. No., filed May 4, 2017, 67 pages.
Sang, "Hybrid Mobility Mechanisms," U.S. Appl. No. 62/443,586, filed Jan. 6, 2017, 70 pages.
Sang, "System and Method for Improving Paging with Assistance," U.S. Appl. No. 62/540,429, filed Aug. 2, 2017, 54 pages.
Sang, "System and Method for User Equipment Operations Management," U.S. Appl. No. 15/376,167, filed Dec. 12, 2016, 52 pages.
Sony, "Cell Quality Measurement Evaluation Using Multiple Beams (Was R2-1700141)," R2-1701504, 3GPP TSG RAN WG2 Meeting #97, Athens, Greece, Feb. 13-17, 2017, 5 pages.
CMCC, "Discussion on intra-NR mobility", XP051151479, 3GPP TSG-RAN WG2 Meeting #95 bis, Kaohsiung, R2-167073, Oct. 10-14, 2016, 4 pages.
CMCC, "Mobility management for connected mode in NR", XP051105132, 3GPP TSG-RAN WG2 Meeting #94, Nanjing, China, R2-163719 May 23-27, 2016, 4 pages.
CATT,"L2 Behaviors in NR Handover or Reconfiguration", XP051211750, 3GPP TSG-RAN WG2 Meeting #97,Athens, Greece, R2-1700984, Feb. 13-17, 2017, 4 pages.
Foreign Communication From a Counterpart Application, European Application No. 18771320.1, Extended European Search Report dated Dec. 17, 2019, 12 pages.

* cited by examiner

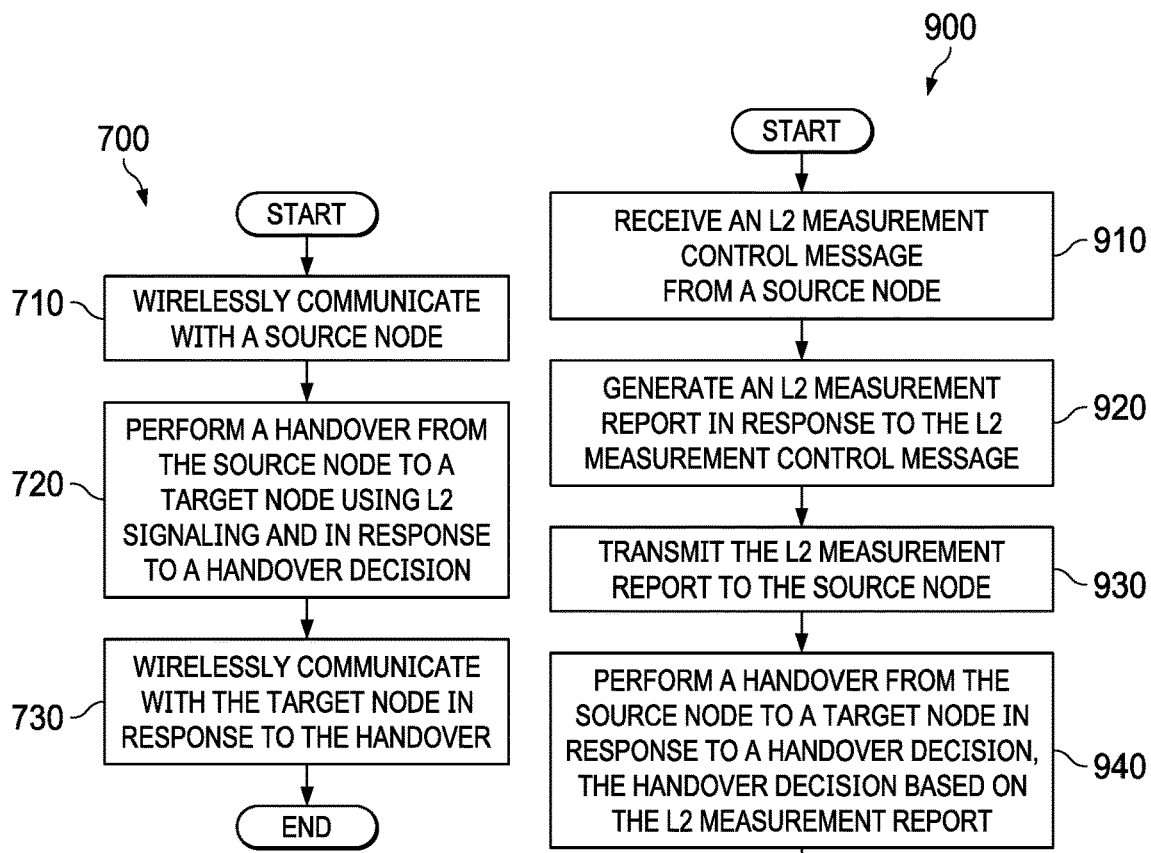
FIG. 7
FIG. 9
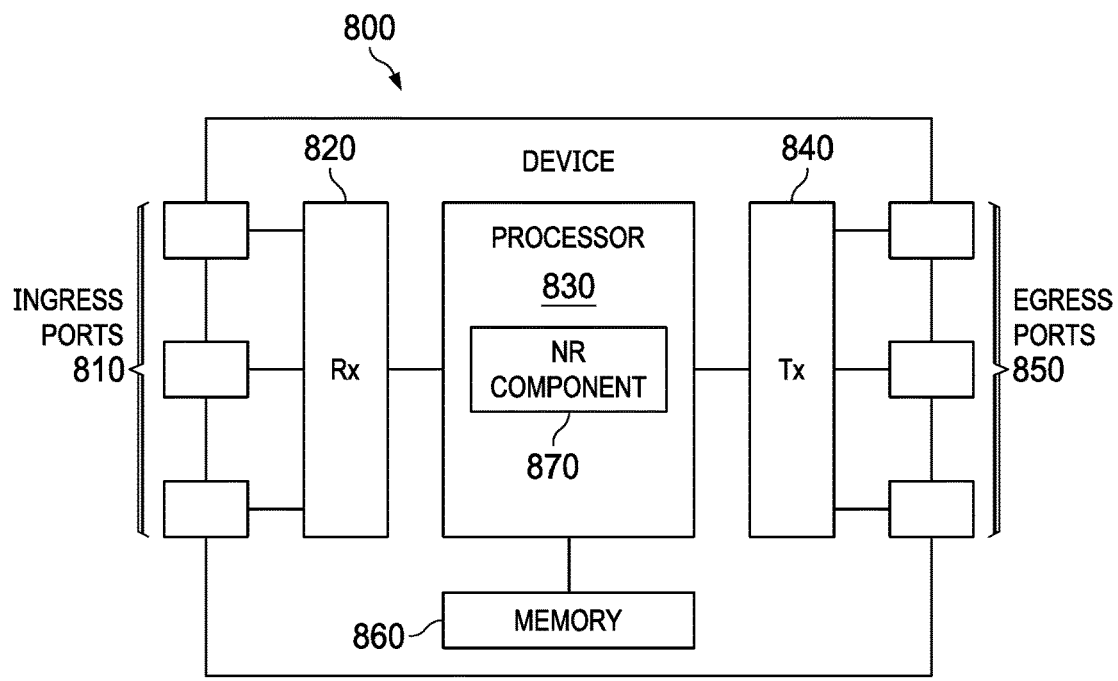
FIG. 8

LAYER 2 (L2) MOBILITY FOR NEW RADIO (NR) NETWORKS

CROSS-REFERENCE TO RELATED APPLICATIONS

This application claims priority to U.S. provisional patent application No. 62/475,339 filed on Mar. 23, 2017 by Futurewei Technologies, Inc. and titled "Layer 2 (L2) Mobility for New Radio (NR) Networks," which is incorporated by reference in its entirety.

BACKGROUND

New mobile phone generations appear about every ten years. Though 4G is the current standard, 5G is in development. 5G may also be referred to as NR. NR promises data rates of 100 Mb/s for metropolitan areas; data rates of 10-100 Mb/s for other areas; simultaneous connections for wireless sensors; improved spectral efficiency, coverage, and signaling; reduced latency; and accommodation of the Internet of Things. NR also promises advanced MM.

Mobility management (MM) is a major function of mobile networks that allows mobile phones to work. MM refers to switching of network-side serving nodes due to UE mobility or significant channel changes. The purpose of MM is to track UEs in order to provide services to those UEs. MM often incurs signaling among source nodes, target nodes, and UEs.

SUMMARY

In accordance with an example embodiment, a UE is provided. The UE includes a memory comprising instructions; and one or more processors in communication with the memory, wherein the one or more processors execute the instructions to: wirelessly communicate with a source node, perform a handover from the source node to a target node using L2 signaling in response to a handover decision between the source node and the target node, and wirelessly communicate with the target node in response to the handover. Optionally, in any of the proceeding embodiments, the UE further comprises a receiver configured to receive an L2 measurement control message from the source node, wherein the L2 measurement control message comprises at least one of first MAC CEs and DCI. Optionally, in any of the proceeding embodiments, the one or more processors execute the instructions to: generate an L2 measurement report in response to the L2 measurement control message, wherein the L2 measurement report comprises at least one of second MAC CEs, UCI, and a RLC status, and wherein the UE further comprises a transmitter configured to transmit the L2 measurement report to the source node. Optionally, in any of the proceeding embodiments, the receiver is further configured to receive an L2 handover command from the source node or the target node in response to the L2 measurement report, wherein the L2 handover command is configured to trigger an RLC reset, a MAC reset, a MAC renewal, or an RLC renewal. Optionally, in any of the proceeding embodiments, the one or more processors execute the instructions to: perform a two-step RACH synchronization with the target node in response to the L2 handover command. Optionally, in any of the proceeding embodiments, the one or more processors execute the instructions to: generate a preamble in response to the L2 handover command, and wherein the transmitter is further configured to transmit the preamble to the target node. Optionally, in any of the proceeding embodiments, the receiver is further configured to receive a RAR in response to the preamble, wherein the RAR comprises a new L2 context. Optionally, in any of the proceeding embodiments, the one or more processors execute the instructions to: perform the handover independent of L3 signaling. Optionally, in any of the proceeding embodiments, the one or more processors execute the instructions to: perform the handover using only L2 signaling or using only L2 signaling and L1 signaling. Optionally, in any of the proceeding embodiments, the L2 signaling comprises at least one of a measurement control message, a measurement report, a handover command, and a context forwarding message.

In accordance with an example embodiment, a method implemented by a UE is provided. The method includes wirelessly communicating with a source node; performing a handover from the source node to a target node using L2 signaling and in response to a handover decision; and wirelessly communicating with the target node in response to the handover. Optionally, in any of the proceeding embodiments, the method further comprises transmitting first UL reference signals to the source node. Optionally, in any of the proceeding embodiments, the method further comprises transmitting second UL reference signals to the target node. Optionally, in any of the proceeding embodiments, the method further comprises receiving a handover command from the source node or the target node, wherein the handover command is configured to trigger a RLC reset or an RLC renewal. Optionally, in any of the proceeding embodiments, the method further comprises further performing the handover in response to the handover command, wherein the handover command comprises at least one of MAC CEs, DCI, and an encapsulated L3 RRC message. Optionally, in any of the proceeding embodiments, the source node is a source DU, the target node is a target DU, and the handover decision originates from a CU.

In accordance with an example embodiment, a method implemented by a UE is provided. The method includes receiving a L2 measurement control message from a source node; generating an L2 measurement report in response to the L2 measurement control message; transmitting the L2 measurement report to the source node, performing a handover from the source node to a target node in response to a handover decision, the handover decision based on the L2 measurement report. Optionally, in any of the proceeding embodiments, the method further comprises receiving a handover command from the target node and in response to the handover decision. Optionally, in any of the proceeding embodiments, the method further comprises receiving a handover request from the target node and in response to the handover decision; generating a handover response in response to the handover request; and transmitting the handover response to the target node. Optionally, in any of the proceeding embodiments, the method further comprises further performing the handover independent of L3 signaling.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a flowchart illustrating a method of L2 mobility according to an embodiment of the disclosure.

FIG. 8 is a schematic diagram of a device according to an embodiment of the disclosure.

FIG. 9 is a flowchart illustrating a method of L2 mobility according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
BM: beam management
CE: control element
CPU: central processing unit
CU: central unit
DCI: downlink control information
DL: downlink
DSP: digital signal processor
DU: distributed unit
eNB: evolved node B
EO: electrical-to-optical
FPGA: field-programmable gate array
gNB: next-generation node B
LTE: Long-Term Evolution
L1: OSI physical layer
L2: OSI data link layer
L3: OSI network layer
MAC: medium access control
Mb/s: megabit(s) per second
MM: mobility management
MSG: message
NG-C: next-generation control plane
NG-U: next-generation user plane
NR: New Radio
OE: optical-to-electrical
OSI: Open System Interconnect
PDCCH: physical downlink control channel
PDCP: Packet Data Convergence Protocol
PDN: packet data network
PHY: physical
PUCCH: physical uplink control channel
PUSCH: physical uplink shared channel
RACH: random-access channel
RAM: random-access memory
RAR: random access response
RF: radio frequency
RLC: radio link control
ROM: read-only memory
RRC: Radio Resource Control
RRH: remote radio head
RRM: radio resource management
RS: reference signal
RX: receiver unit
SRAM: static RAM
TCAM: ternary content-addressable memory
TRP: transmission and reception point
TX: transmitter unit
UCI: uplink control information
UE: user equipment
UL: uplink
4G: fourth-generation mobile network
5G: fifth-generation mobile network.

Figure 1:
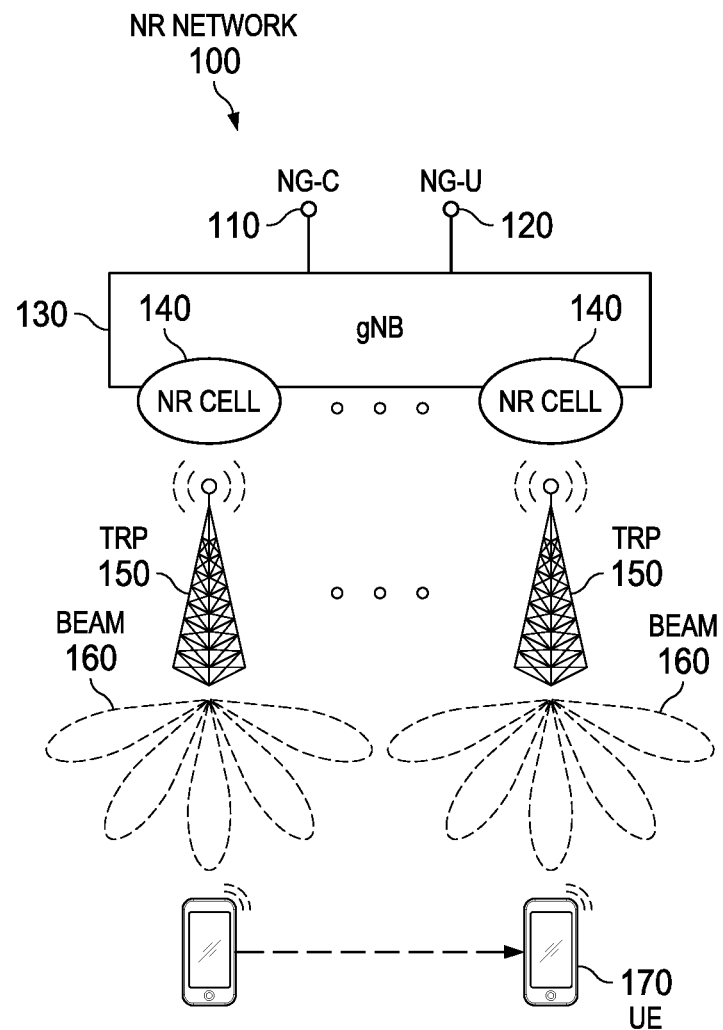
FIG. 1 is a schematic diagram of an NR network.

FIG. 1 is a schematic diagram of an NR network 100. The NR network 100 comprises an NG-C 110, an NG-U 120, a gNB 130, NR cells 140, TRPs 150, beams 160, and a UE 170. The NG-C 110 is a control plane of a core network. The NG-U 120 is a user plane of the core network. The gNB 130, NR cells 140, TRPs 150, and UE 170 may also be referred to as nodes. The gNB 130 and the TRPs 150 reside on a network side of the NR network 100, and the UE 170 resides on a user side of the NR network 100.

The gNB 130 may be functionally similar to a 4G eNB. However, the gNB 130 logically and physically comprises one CU, one or multiple DUs, and one or multiple TRPs. Each CU connects to one or multiple DUs and may anchor RRC and PDCP functions, and each DU connects to one or multiple TRPs and may anchor RLC and other lower-layer functions such as MAC and PHY functions. The TRPs host physical components such as antennas and other RF components. Depending on an operator's deployments, CUs, DUs, and TRPs may be physically separated or collocated and may perform different logical functions. For instance, the gNB 130 is a tower similar to a 4G eNB, but comprises a CU, DUs, or TRPs and covers the NR cells 140, and the NR cells 140 are similar to multiple 4G eNBs cells. In that case, the gNB 130 is a central controller that couples to the NR cells 140 via a fiber or other medium and that controls the NR cells 140; the CU of the gNB 130 may implement PDCP and L3 RRC functions; and each DU of the gNB 130 corresponding to one of the NR cells 140 may implement RLC, MAC, or PHY layer functions. The NR cells 140 logically comprise both the gNB 130 and the UE 170.

The TRPs 150 are inside and at edges of the NR network 100, communicate with the UE 170 using the beams 160, and may comprise RRHs or antennas that implement MAC, PHY, or full RF-layer functions. The beams 160 are radio signals. The UE 170 is a mobile phone or other radio-enabled device. Though some of the components of the NR network 100 are described as logical components, one or more hardware devices, or software on those hardware devices, implement the components of the NR network 100.

As shown by a dashed arrow, the UE 170 experiences a handover from a first location to a second location. During the handover, the UE 170 performs L2 mobility, which is described below. Specifically, the UE 170 remains under the control of the same gNB 130, but hands over from a first NR cell 140 to a second NR cell 140 without implementing an RRC anchor change. That is different from a 4G handover in which the UE 170 hands over from a first eNB to a second eNB with an RRC control anchor change.

Figure 2:
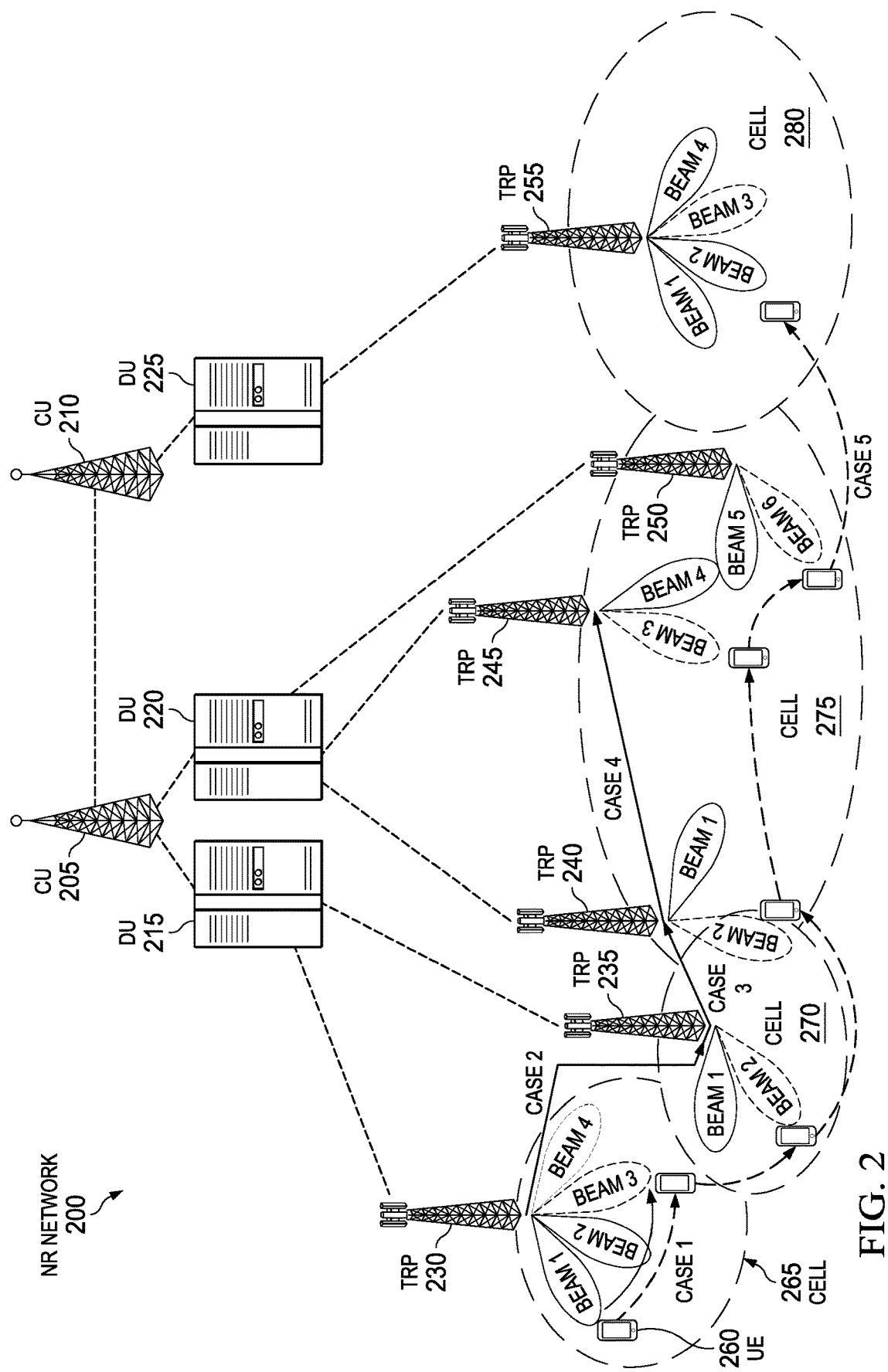
FIG. 2 is a schematic diagram of an NR network demonstrating four mobility cases.

FIG. 2 is a schematic diagram of an NR network 200 demonstrating four mobility cases. The NR network 200 comprises CUs 205, 210, each belonging to a different gNB; DUs 215, 220, 225; TRPs 230, 235, 240, 245, 250, 255; a UE 260; and cells 265, 270, 275, 280. The CUs 205, 210; DUs 215, 220, 225; TRPs 230, 235, 240, 245, 250, 255; UE 260; and cells 265, 270, 275, 280 may also be referred to as nodes. Each of the CUs 205, 210 corresponds to a separate gNB 130, and each of the DUs 215, 220, 225 corresponds to one or more of the NR cells 140. The NR network 200 demonstrates different deployment architectures. Specifically, the CU 205; DUs 215, 220; and TRPs 230, 235, 240, 245, 250 correspond to one logical gNB. The DU 215 corresponds to multiple cells 265, 270, and one TRP 230, 235 corresponds to each cell 265, 270. The DU 220 corresponds to one cell 275 that corresponds to three TRPs 240, 245, 250. The CU 210, one DU 225, one TRP 255, and one cell 280 correspond to one logical gNB. The four mobility cases are described below.

Case 1 occurs when the UE 260 hands over from beam 1 to beam 3 in the cell 265. Beam 1 may be referred to as a source beam, and beam 3 may be referred to as a target beam. Case 1 demonstrates L1 intra-TRP BM and L1 intra-DU BM. L1 is a PHY layer and comprises radio, DSP or baseband electrical, and mechanical connections to the NR network 200, transmission of binary data as changing voltage levels on wires, and other similar concepts. BM normally refers to intra-cell, beam-specific operations such as beam alignment, refinement, tracking, determination, measurement, sweeping, reporting, selection, failure recovery, or switching.

Case 2 occurs when the UE 260 hands over from beam 3 of the TRP 230 to beam 2 of the TRP 235 and when the TRPs 230, 235 are associated with the same DU 215. The TRP 230 may be referred to as a source TRP, and the TRP 235 may be referred to as a target TRP. Each TRP 230, 235 corresponds to a different cell 265, 270. Case 2 demonstrates L2 intra-DU BM or L2 intra-DU MM, the latter because case 2 involves a cell change using MM and not just intra-cell BM. L2 MM refers to MM without RRC or PDCP anchor changes. L2 is a link layer, data link layer, MAC layer, RLC layer, or PDCP layer. L2 implements communications protocols that use L1 PHY operations and physical addresses of nodes. L2 processing is faster than L3 processing because L2 processing uses lower-layer packet processing and may use hardware acceleration. Alternatively, each TRP 230, 235 corresponds to a different DU of a same gNB and each DU corresponds to a different cell so that a handover between two TRPs or two cells is referred to as L2 inter-DU MM. Case 2 presents more latency and service interruptions than L1 intra-cell BM operations can manage.

Case 3 occurs when the UE 260 hands over from the TRP 235 to the TRP 240, which are associated with different DUs 215, 220, but are associated with the same CU 205. The TRP 235 may be referred to as a source TRP, and the TRP 240 may be referred to as a target TRP. Similarly, the cell 270 may be referred to as a source cell, and the cell 275 may be referred to as a target cell. Case 3 demonstrates L2 inter-DU MM. To manage case 3, the DUs 215, 220 may communicate with each other with limited or no RRC layer involvement.

Case 4 occurs when the UE 260 hands over from the TRP 240 to the TRP 245, which are both associated with the same cell 275 and the same DU 220. The TRP 240 may be referred to as a source TRP, and the TRP 245 may be referred to as a target TRP. Case 4 demonstrates intra-DU BM and inter-TRP BM. Together, cases 1-4 demonstrate intra-CU mobility using either intra-cell BM or inter-cell MM.

Case 5 occurs when the UE 260 hands over from the CU 205 to the CU 210 and thus involves an L3 RRC anchor change and a cell change. The CU 205 may be referred to as a source CU, and the CU 210 may be referred to as a target CU. L3 is a network layer, an RRC layer, or both a network layer and an RRC layer. L3 implements RRC and above communications protocols that use logical addresses of nodes and use type fields to prioritize and forward traffic based on message types and network destinations. Case 5 demonstrates inter-CU MM. To manage case 5, the CU 205 and the CU 210 perform L3 RRC signaling, and the UE 260 performs context switching from the CU 205 to the CU 210. In addition to inter-CU L3 MM, case 5 may also implement L3 MM assisted with L2 MM or a hybrid of L2 MM and L3 MM. The following table illustrates the various cases:

TABLE 1

| | Mobility Cases | | | | | | | |
|---|---|---|---|---|---|---|---|---|
| | TRP | | Cell | | DU | | CU | |
| Case | Inter | Intra | Inter | Intra | Inter | Intra | Inter | Intra |
| 1 | | X | | X | | X | | X |
| 2 | X | | X | | | X | | X |
| 3 | X | | X | | X | | | X |
| 4 | X | | | X | | X | | X |
| 5 | X | | X | | X | | X | |

L3 signaling may be slow or unreliable due to more frequent end-to-end loss across multiple hops, more hop numbers, and more layered processing, which result in longer handover latency, more handover failures, greater UE power consumption, and increased signaling overhead. It is therefore desirable to adopt L2 mobility when it beneficially reduces or avoids L3 signaling, including for the intra-CU mobility and the inter-DU mobility described above. Such L2 mobility would be quicker and use less overhead.

Disclosed herein are embodiments for L2 mobility for NR networks. The embodiments provide L2 mobility using L1 or L2 signaling, while reducing or avoiding L3 signaling, including L3 RRC signaling. The embodiments implement, for instance, case 2 and case 3 above. In this context, signaling may be understood to comprise or correspond with processing. The L2 signaling is signaling between a DU or its TRPs on the one hand and a UE on the other hand, or L2 signaling is between DUs or their TRPs. Such L2 signaling partially or fully replaces the L3 RRC signaling between a CU and a UE and comprises MAC CEs, DCI for a PDCCH, UCI for a PUCCH or a PUSCH, other MAC layer messages mapped from RRC messages of light weight or simplified content, and other signaling that offers similar RRC functionality at a MAC, PDCP, RLC, or other layer below an RRC layer. The function of the L2 signaling may be similar to L3 measurement reports, mobility configuration, handover commands, another L3 signaling, but may be more concise, simpler, or faster for control turn-around. DUs generate the L2 signaling based on dynamic RRC or static system configurations from CUs, statically programmed policies or parameters, localized UL measurement from TRPs, DL measurement reports from a UE to the TRPs in the UL, or localized DL measurement reports from the UE. The disclosed embodiments provide L2 mobility that is faster, uses less overhead, and uses fewer hops of non-ideal links among components. Both maintaining an anchor at a CU and using inter-DU L2 mobility reduces or avoids overhead from resetting radio bearers, resetting security contexts, and unnecessary RRC handshakes during a handover from a source DU to a target DU and setting up UE access to the target DU. Logical partitions of CUs and DUs and layered protocols are used for conceptual explanation, but actual implementation may vary depending on a physical link quality between CUs and DUs, a physical link quality between DUs and TRP, availability of inter-DU communications, and the definition of a cell.

Figure 3:
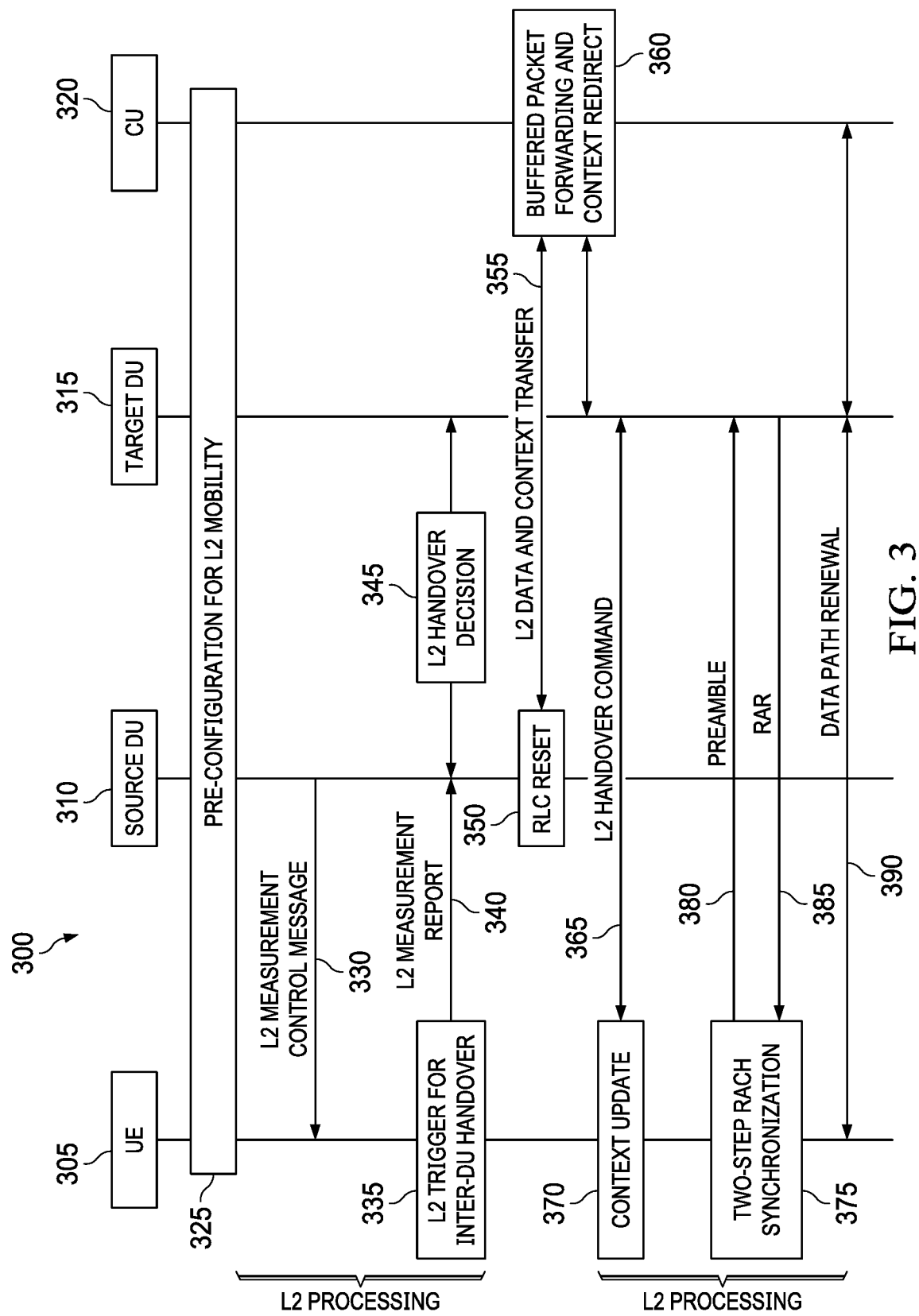
FIG. 3 is a message sequence diagram demonstrating L2 mobility using L3 DL mobility as a foundation according to an embodiment of the disclosure.

FIG. 3 is a message sequence diagram 300 demonstrating L2 mobility using L3 DL mobility as a foundation according to an embodiment of the disclosure. A UE 305, a source DU 310, a target DU 315, and a CU 320 implement the message sequence diagram 300. The message sequence diagram 300 may implement case 2 in FIG. 2 so that the source DU 310 is the TRP 230; the target DU 315 is the TRP 235; the TRPs 230, 235 implement L2 protocols in addition to RF functions; and the CU 320 is CU 205 or the DU 215. The message sequence diagram 300 may also implement case 3 in FIG. 2 so that the source DU 310 is the DU 215 or the TRP 235; the target DU 315 is the DU 220 or the TRP 240; and the TRPs 235, 240 either implement only RF functions and therefore be transparent or implement some L2 protocols and are therefore part of the messaging; and the CU 320 is the CU 205.

At step 325, the UE 305, the source DU 310, the target DU 315, and the CU 320 perform pre-configuration for L2 mobility. The pre-configuration comprises dynamic L3 RRC signaling, dynamic L2 signaling, dynamic selection of the mobility scheme, or statically-programmed policies or parameters. At step 330, the source DU 310 transmits to the UE 305 an L2 measurement control message using L1 signaling or L2 signaling of MAC CEs, DCI, or UCI. The L2 measurement control message is functionally similar to an L3 RRC connection reconfiguration message.

At step 335, an L2 trigger for an inter-DU handover occurs at the UE 305. At step 340, the UE 305 transmits an L2 measurement report to the source DU 310. The L2 measurement report comprises CEs, UCI, or an RLC status. At step 345, the source DU 310 and the target DU 315 perform an L2 handover decision with messages over a direct interface. Alternatively, the source DU 310 learns of the target DU 315 or vice versa through the CU 320. The L2 handover decision may comprise an admission control decision made by the target DU 315.

At step 350, the source DU 310 performs an RLC reset. Step 350 occurs when the source DU 310 and the target DU 315 agree to the L2 handover decision. At step 355, the source DU 310 and the CU 320 perform an L2 data and context transfer. The source DU 310 may initiate the L2 data and context transfer because it learns of the L2 handover decision earlier than the target DU 315 in order to notify the CU 320 about the L2 handover decision. Because the CU 320 remains the same after the handover and thus a PDCP anchor at the CU 320 stays the same, a security context and a PDN bearer also stay the same so that only RLC layer and below contexts may be exchanged between the source DU 310 and the target DU 315. Step 355 may also comprise an explicit handover request from the source DU 310 to the CU 320 and then a handover response from the CU 320 to the source DU 310, or vice versa. At step 360, the target DU 315 and the CU 320 perform buffered packet forwarding, or redirecting, to the target DU 315 and a context redirect similar to the process at step 355. Step 360 may use a PDCP split bearer similar to that in LTE dual connectivity or may use another feasible bearer.

At step 365, the target DU 315 transmits to the UE 305 an L2 handover command using L1 signaling or L2 signaling of MAC CEs, DCI, or UCI rather than using L3 RRC signaling. The L2 handover command comprises an RLC renewal, a target cell identifier, an L2 context, a pre-assigned preamble for RACH, or other information. The L2 handover command may be an L1 message or an L2 message converted from an RRC-level command, or an L1 or L2 encapsulation of the L3 RRC message. Alternatively, the target DU 315 transmits a handover request to the UE 305 and the UE 305 transmits a response to the target DU 315, or vice versa. Alternatively, the source DU 310 transmits to the UE 305 the L2 handover command or request, which the UE 305 acknowledges. At step 370, the UE 305 performs a context update.

At step 375, the UE 305 and the target DU 315, or the UE 305 and TRPs associated with the target DU 315, start the handover process by performing a RACH synchronization, which may be a two-step RACH synchronization. The two-step RACH synchronization implies that no L3 RRC handshake is needed. Alternatively, the RACH synchronization is a four-step RACH synchronization involving RRC-level signaling with the CU 320. Step 375 comprises steps 380 and 385. At step 380, the UE 305 transmits a preamble to the target DU 315. The UE 305 may also transmit additional information. At step 385, the target DU 315 transmits a RAR to the UE 305. The RAR comprises a new L2 context and may also comprise other information. Finally, at step 390, the UE 305, the target DU 315, and the CU 320 perform a data path renewal. The UE 305, the target DU 315, and the CU 320 may also perform a control path renewal.

As shown, at least steps 330-345, 365, and 370-390 implement L2 signaling to perform a handover. Alternatively, the message sequence diagram 300 uses only L2 signaling or L1 signaling to perform the handover. The message sequence diagram 300 therefore reduces or avoids L3 signaling, or the message sequence diagram 300 is independent of L3 signaling. When the message sequence diagram 300 implements case 2 in FIG. 2, there may be no RLC reset because the RLC anchors at the same DU 215 so that the DU 215 or the TRPs 230, 235 make the L2 handover decision without the context transfer. The DU 215 or the CU 205 corresponding to the DU 215 receives notification of the handover decision via a backhaul link or a fronthaul link.

Figure 4:
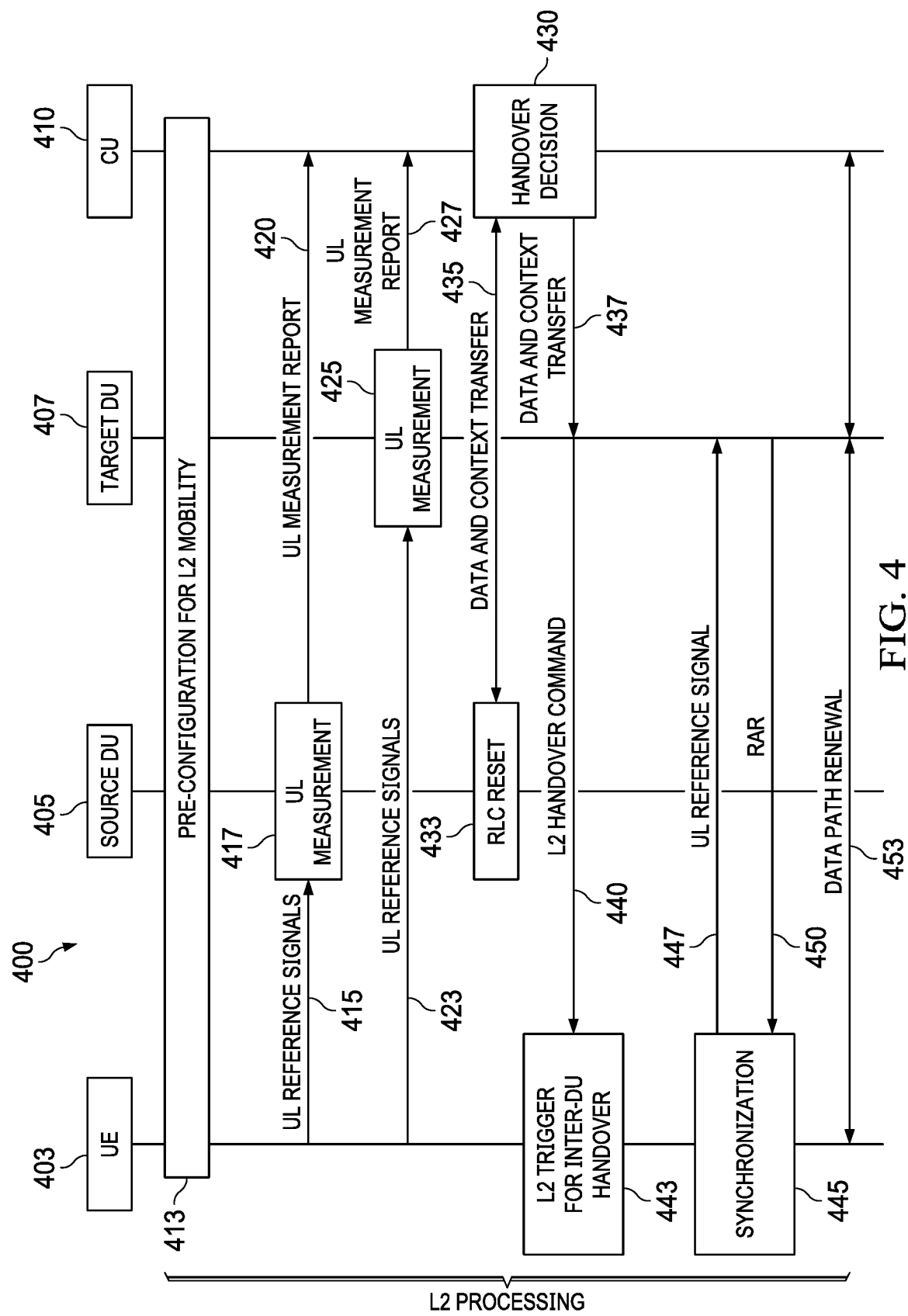
FIG. 4 is a message sequence diagram demonstrating L2 mobility using UL mobility as a foundation according to an embodiment of the disclosure.

FIG. 4 is a message sequence diagram 400 demonstrating L2 mobility using L3 UL mobility as a foundation according to an embodiment of the disclosure. U.S. patent application Ser. No. 15/376,167 filed on Dec. 12, 2016 by Futurewei Technologies, Inc. and titled "System and Method for User Equipment Operations Management," which is incorporated by reference, describes L3 UL mobility. A UE 403, a source DU 405, a target DU 407, and a CU 410 implement the message sequence diagram 400. The message sequence diagram 400 may implement case 2 in FIG. 2 so that the source DU 405 is the TRP 230, the target DU 407 is the TRP 235, and the CU 410 is the DU 215. The message sequence diagram 400 may also implement case 3 in FIG. 2 so that the source DU 405 is the DU 215 or the TRP 235, the target DU 407 is the DU 220 or the TRP 240, and the CU 410 is the CU 205.

At step 413, the UE 403, the source DU 405, the target DU 407, and the CU 410 perform pre-configuration for L2 mobility in a manner similar to step 325 in in the message sequence diagram 300 in FIG. 3. At step 415, the UE 403 transmits to the source DU 405 UL reference signals. At step 417, the source DU 405 performs a UL measurement of UL reference signal quality. The source DU 405 may do so using only L1 signaling or using a combination of L1 signaling and L2 signaling. At step 420, the source DU 405 transmits to the CU 410 a UL measurement report. At step 423, the UE 403 transmits to the target DU 407 UL reference signals. At step 425, the target DU 407 performs an L2 UL measurement. At step 427, the target DU 407 transmits a UL measurement report to the CU 410.

At step 430, the CU 410 performs a handover decision. The CU 410 does so by considering the UL measurement reports, and the handover decision includes any combination of an admission control at the target DU 407, a resource release of the source DU 405, resource reservation of the target DU 407, context synchronization and transfer, or data forwarding. Alternatively, the source DU 405 and the target DU 407 exchange measurement reports and perform the handover decision, and the CU 410 receives notification of the handover decision. At step 433, the source DU 405 performs an RLC reset. Alternatively, the source DU 405 performs a MAC reset, a MAC renewal, or an RLC renewal. At step 435, the source DU 405 and the CU 410 perform an L2 data and context transfer. Step 435 comprises a request from the CU 410 to the source DU 405 and a response from the source DU 405 to the CU 410, or vice versa. At step 437, the target DU 407 and the CU 410 perform an L2 data and context transfer. At step 440, the target DU 407 transmits to the UE 403 an L2 handover command using L1 signaling or L2 signaling instead of L3 RRC signaling. The L2 handover command comprises an RLC renewal, a target cell identifier, an L2 context, a pre-assigned preamble, or other information. Alternatively, the target DU 407 transmits a handover request to the UE 403 and the UE 403 transmits a response to the target DU 407, or vice versa. Alternatively, the source DU 405 transmits to the UE 403 the L2 handover command, which the UE 403 acknowledges. The UE 403 may also perform a context update. At step 443, an L2 trigger for an inter-DU handover occurs at the UE 403.

At step 445, the UE 403 and the target DU 407, or the UE 403 and TRPs associated with the target DU 407, perform a synchronization. The synchronization is a two-step synchronization without L3 RRC involvement and may be a RACH synchronization or a RACH-less synchronization. Alternatively, the synchronization is a four-step RACH synchronization involving RRC-level signaling with the CU 410. Step 445 comprises steps 447 and 450. At step 447, the UE 403 transmits a UL reference signal to the target DU 407. The UL reference signal may comprise a preamble. At step 450, the target DU 407 transmits a RAR to the UE 403. The RAR comprises a new L2 context and may also comprise other information. Step 445 may not be needed if the reference signals at step 423 keep the UE 403 and the target DU 407 synchronized. Finally, at step 453, the UE 403, the target DU 407, and the CU 410 perform a data path renewal. The UE 403, the target DU 407, and the CU 410 may also perform a control path renewal.

As shown, at least steps 413-453 implement L2 signaling to perform a handover. Alternatively, the message sequence diagram 400 uses only L2 signaling or L1 signaling to perform the handover. The message sequence diagram 400 therefore reduces or avoids L3 signaling, or the message sequence diagram 400 is independent of L3 signaling. Alternatively, the message sequence diagram 400 implements L1, L2, or L3 signaling in a hybrid L2 and L3 UL mobility.

Looking at the UL reference signals and the UL measurement report in the message sequence diagram 400, it can be seen that the UL mobility in the message sequence diagram 400 is more efficient than the DL mobility in the message sequence diagram 300 in FIG. 3. That is because steps 415-427 in the message sequence diagram 400 comprise UL transmissions of small UL reference signals, which are more efficient than steps 330-340 in the message sequence diagram 300. However, both steps 330-340 in the message sequence diagram 300 and steps 415-427 in the message sequence diagram 400 benefit from L2 or lower signaling and unidirectional transmission efficiency from the UEs 305, 403 on one hand to the DUs 310, 315, 405, 407 and the CUs 320, 410 on the other hand. The DL mobility in the message sequence diagram 300 and the UL mobility in the message sequence diagram 400 may be combined in any suitable manner and occur simultaneously.

Figure 5:
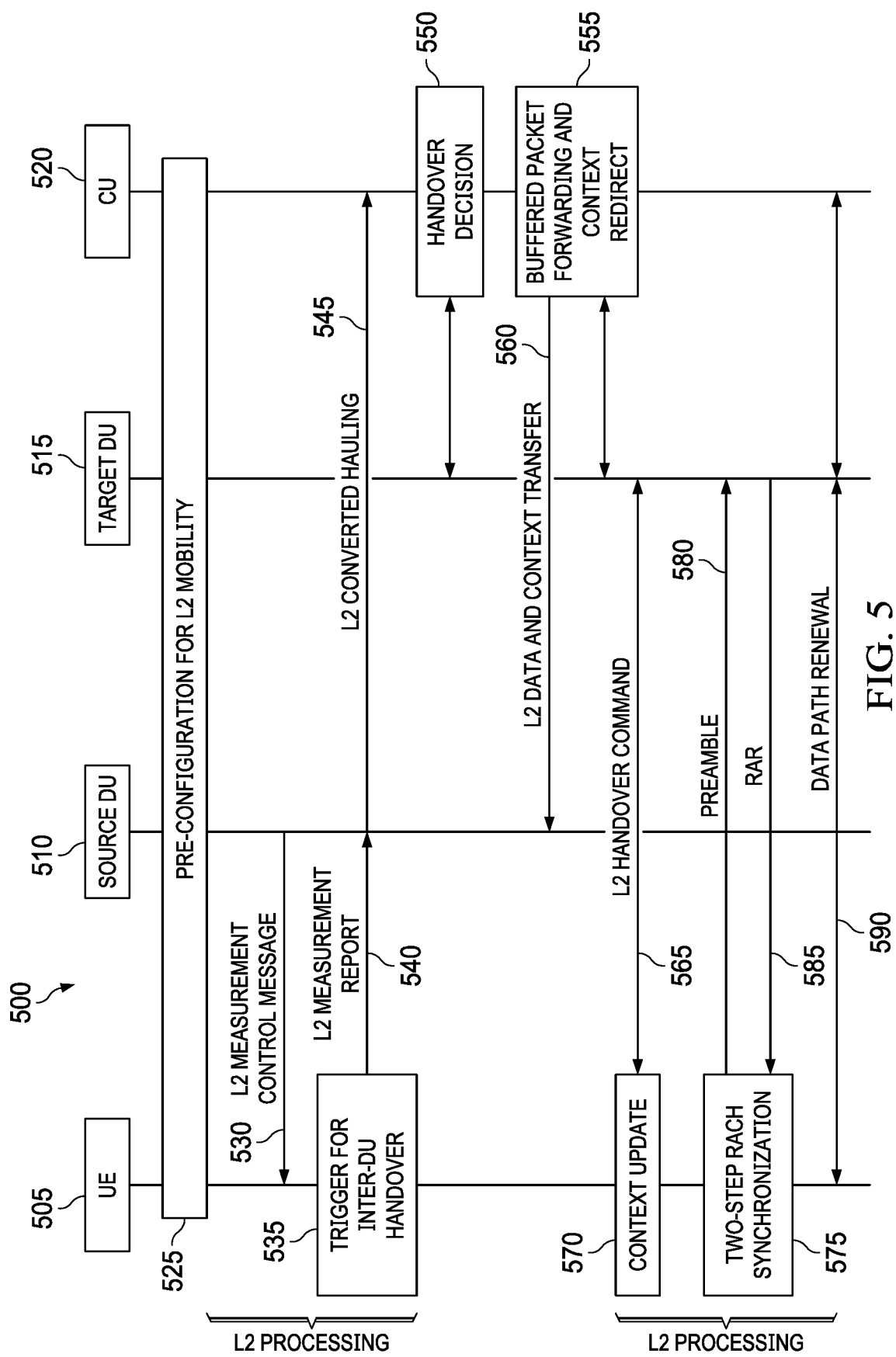
FIG. 5 is a message sequence diagram demonstrating L2 mobility using DL mobility as a foundation according to another embodiment of the disclosure.

FIG. 5 is a message sequence diagram 500 demonstrating L2 mobility using L3 DL mobility as a foundation according to another embodiment of the disclosure. A UE 505, a source DU 510, a target DU 515, and a CU 520 implement the message sequence diagram 500. The message sequence diagram 500 may implement case 2 in FIG. 2 so that the source DU 510 is the TRP 230, the target DU 515 is the TRP 235, and the CU 520 is the DU 215 or the CU 205. The message sequence diagram 500 may also implement case 3 in FIG. 2 so that the source DU 510 is the DU 215, the target DU 515 is the DU 220, and the CU 520 is the CU 205.

The message sequence diagram 500 is similar to the message sequence diagram 300 in FIG. 3. However, unlike the message sequence diagram 300, which implements a handover decision between the source DU 310 and the target DU 315, the message sequence diagram 500 implements a handover decision by the CU 520. To do so, at step 545, the source DU 510 transmits to the CU 520 an L2 converted backhauling or fronthauling message reporting measurement results of DL channel quality received by the UE 505 from neighboring DUs or TRPs and reporting measurement results of DU or TRP resource availability. Though step 565 shows that the target DU 515 transmits the L2 handover command to the UE 505 and that the target DU 515 receives an acknowledgment in response, the source DU 510 may instead transmit the L2 handover command to the UE 505 and the source DU 510 may receive an acknowledgment in response.

An NR network may implement the message sequence diagram 300 when there is a direct link between the source DU 310 and the target DU 315. However, the NR network may implement the message sequence diagram 500 when there is no direct link between the source DU 510 and the target DU 515. The NR network may implement a message sequence diagram similar to the message sequence diagram 500, but using UL mobility instead of DL mobility as a foundation.

Figure 6:
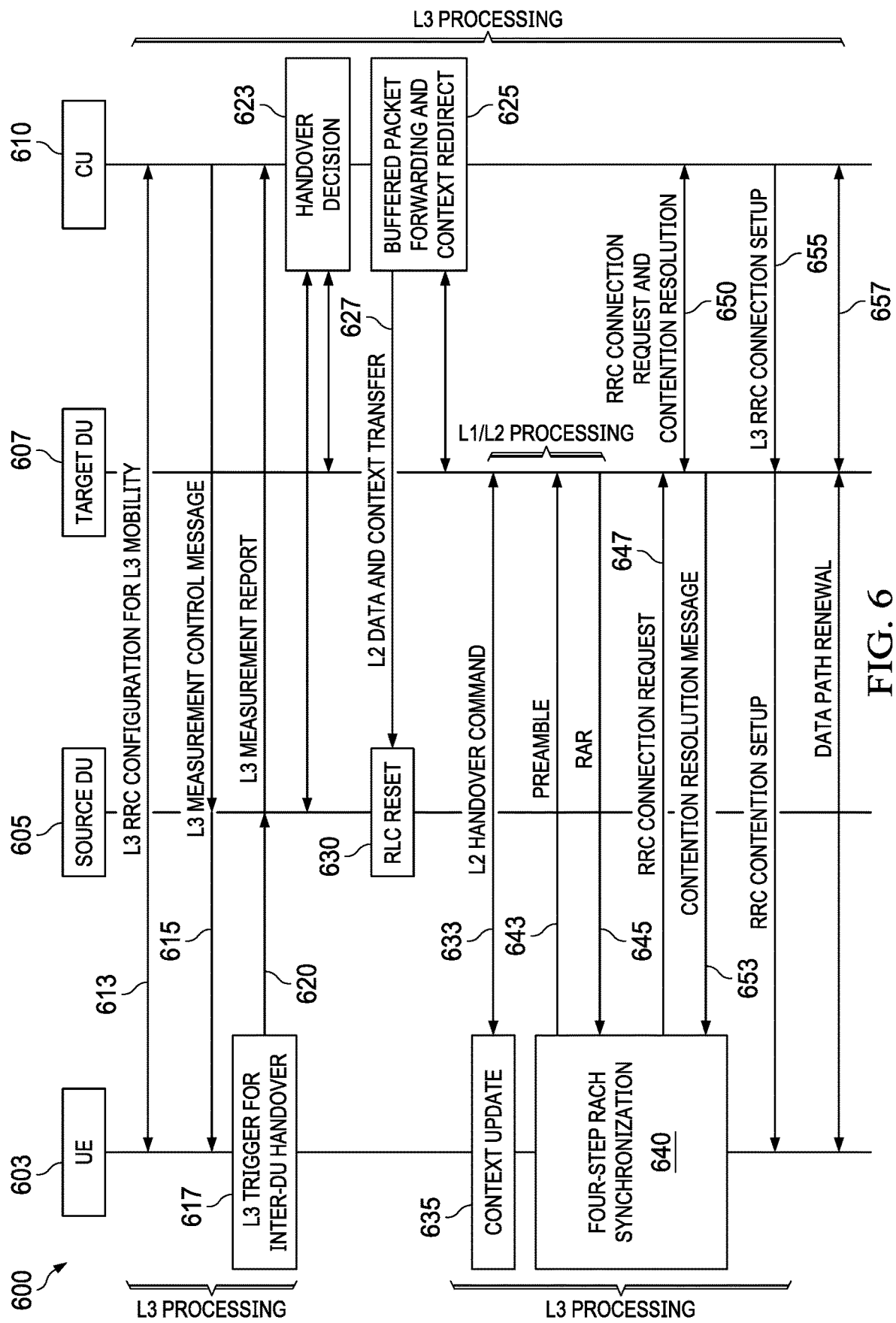
FIG. 6 is a message sequence diagram demonstrating L3 mobility using DL mobility as a foundation according to an embodiment of the disclosure.

FIG. 6 is a message sequence diagram 600 demonstrating L3 mobility using L3 DL mobility as a foundation according to an embodiment of the disclosure. A UE 603, a source DU 605, a target DU 607, and a CU 610 implement the message sequence diagram 600. The message sequence diagram 600 may implement case 2 in FIG. 2 so that the source DU 605 is the TRP 230, the target DU 607 is the TRP 235, and the CU 610 is the DU 215 or the CU 205. The message sequence diagram 600 may implement case 3 in FIG. 2 so that the source DU 605 is the DU 215, the target DU 607 is the DU 220, and the CU 610 is the CU 205.

At step 613, the UE 603 and the CU 610 communicate legacy or enhanced L3 RRC configuration signaling. For instance, the configuration signaling comprises a DL RRC connection reconfiguration message with mobility scheme selection information, parameter information, or measurement configuration information enhanced with a preference of L3 mobility messaging involving the CU 610. At step 615, the CU 610 transmits an L3 measurement control message to the UE 603. The source DU 605 may relay the L3 measurement control message at L2 or L1 using an encapsulated L3 RRC message.

At step 617, an L3 trigger for inter-DU HO occurs at the UE 603. The L3 trigger occurs based on DL RRM measurements. At step 620, the UE 603 transmits to the source DU 605 an L3 measurement report, which the source DU 605 forwards to the CU 610. Alternatively, the L3 measurement report is at L2 or L1 and the source DU 605 relays the L3 measurement report to the CU 610 at L3. At step 623, the CU 610 performs a handover decision. The CU 610 may do so in a manner similar to the message sequence diagram 500 in FIG. 5. The CU 610 may communicate the handover decision to the source DU 605 or the target DU 607.

At step 625, the source DU 605 and the CU 610 perform buffered packet forwarding and a context redirect from the source DU 605 to the target DU 607. Step 625 comprises a request from the CU 610 to the source DU 605 and a response from the source DU 605 to the CU 610, or vice versa. Step 625 may use a PDCP split bearer similar to LTE dual connectivity. At step 627, the source DU 605 and the CU 610 perform a data and context transfer or an RLC reset. At step 630, the source DU 605 performs an RLC reset. The source CU 610 and the target DU 607 may perform similar steps by reserving resources or setting up a context at the target DU 607 to hand over to the UE 603.

At step 633, the target DU 607 transmits to the UE 603 an L2 handover command. The L2 handover command is an encapsulated L3 RRC handover message using L2 or L1 signaling because the source DU 605 and the target DU 607 may not have RRC functionality. Alternatively, the UE 603 and the source DU 605 communicate and acknowledge the L2 handover command. The L2 handover command comprises an RLC renewal, a target cell identifier, an L2 context, a pre-assigned preamble, or other information. Alternatively, the target DU 607 transmits a handover request to the UE 603 and the UE 603 transmits a response to the target DU 607, or vice versa. At step 635, the UE 603 performs a context update. The UE 603 may also execute the handover. The UE 603 may process the context update and execute the handover at L3 because the L2 handover command is an encapsulated L3 RRC message.

At step 640, the UE 603, the target DU 607, and the CU 610 perform a four-step RACH synchronization. Alternatively, the UE 603, the target DU 607, and the CU 610 perform a two-step RACH synchronization. Step 640 comprises steps 643, 645, 647, 650, and 653. At step 643, the UE 603 transmits a preamble to the target DU 607. The UE 603 may also transmit additional information. At step 645, the target DU 607 transmits a RAR to the UE 603. At step 647, the UE 603 transmits an RRC connection request to the target DU 607, which the target DU 607 may forward to the CU 610. The RRC connection request may be an L1-encapsulated message or an L2-encapsulated message. At step 650, the target DU 607 transmits an RRC connection request to the CU 610 and performs contention resolution. The target DU 607 may perform contention resolution with multiple UEs directly or through the CU 610. At step 653, the target DU 607 transmits a contention resolution message to the UE 603. The target DU 607 may also forward the contention resolution message to the CU 610 or learn of the newly assigned identification, resource, or context information of the UE 603 from the CU 610. At step 655, the UE 603, the target DU 607, and the CU 610 perform an L3 RRC connection setup. The target DU 607 may relay the signaling as an encapsulated L3 RRC message using L1 or L2 signaling. Finally, at step 657, the UE 603, the target DU 607, and the CU 610 perform a data path renewal. Note that step 633~635 and 647~655 involve L3 RRC processing at the UE 603 if the handover commands are encapsulated RRC message, but in a different embodiment this can be more efficiently handled by L1 or L2 processing and signaling, for example, if the target DU 607 issues the handover command as a new L1 or L2 handover signaling message to the UE 603.

As shown, steps 633-645 may implement L2 signaling using encapsulated L3 RRC messages. However, at least steps 613-617, 633, and 647-655 may also implement L2 signaling, where the L2 signaling may include L2 messages converted from L3 RRC signaling. L3 RRC signaling comprises more complex L3 messages, more hops of wireless links, and slower L3 processing at both the UE 603 likes at steps 617, 635, and 640 and the CU 610. The source DU 605 and the target DU 607 may serve as proxies that perform L1 or L2 signaling with encapsulated or converted L3 RRC message.

The above approaches show various pre-configurations. For instance, DUs may relay dynamic L3 RRC signaling between UEs and CUs or may use mixed L3 signaling with the CUs and L1 or L2 signaling with the UEs. Alternatively, the pre-configurations implement pre-programmed parameters. Duplicate radio carriers, L2 user planes, or dedicated RACH preambles may enhance those approaches.

In FIGS. 3-6, the same logical processes may be implemented using other specific steps or by reordering the steps. As one example, step 350 in FIG. 3 may not occur because in a duplicate radio bearer the RLC does not reset, but remains simultaneously activated as the RLC with the target DU 315. As another example, though the source DU 310 and the target DU 315 in FIG. 3 are shown as performing the L2 handover decision at step 345, either the source DU 310 or the target DU 315 may unilaterally make the L2 handover decision and then notify the CU 320. As another example, handovers from source nodes to target nodes may include additional target nodes to serve the same UE without disconnecting from the source nodes, and the source nodes may be TRPs, DUs, or CUs. In general, the message sequence diagrams 300, 400, 500, 600 may be revised to accommodate at least cases 2-3 and 5 in FIG. 2 by mixing both L2 and L3 MM. For example, the order or content of the flow messages in the figures and flow diagrams may be shuffled or refined. For example, FIG. 7 is a flowchart illustrating a method 700 of L2 mobility according to an embodiment of the disclosure. The UE 403 may perform the method 700. At step 710, a source node is wirelessly communicated with. For instance, the UE 403 wirelessly communicates with the source DU 405 to communicate voice data and other data associated with a user of the UE 403. At step 720, a handover from the source node to a target node is performed using L2 signaling and in response to a handover decision. For instance, the L2 signaling comprises the UL reference signals at steps 415 and 423, the UL measurement reports at steps 420 and 427, the data and context transfers at steps 433 and 437, and either the handover command or the handover request and the handover response at step 440. For instance, the CU 410 performs the handover decision. Finally, at step 730, the target node is wirelessly communicated with in response to the handover. For instance, the UE 403 wirelessly communicates with the target DU 407 to communicate voice data and other data associated with the user.

FIG. 8 is a schematic diagram of a device 800 according to an embodiment of the disclosure. The device 800 may implement the disclosed embodiments. The device 800 comprises ingress ports 810 and an RX 820 for receiving data; a processor, logic unit, baseband unit, or CPU 830 to process the data; a TX 840 and egress ports 850 for transmitting the data; and a memory 860 for storing the data. The device 800 may also comprise OE components, EO components, or RF components coupled to the ingress ports 810, the RX 820, the TX 840, and the egress ports 850 for ingress or egress of optical or electrical signals.

The processor 830 is any suitable combination of hardware, middleware, firmware, or software. The processor 830 comprises any combination of one or more CPU chips, cores, FPGAs, ASICs, or DSPs. The processor 830 communicates with the ingress ports 810, RX 820, TX 840, egress ports 850, and memory 860. The processor 830 comprises an NR component 870, which implements the disclosed embodiments. The inclusion of the NR component 870 therefore provides a substantial improvement to the functionality of the device 800 and effects a transformation of the device 800 to a different state. Alternatively, the memory 860 stores the NR component 870 as instructions, and the processor 830 executes those instructions. Alternatively, any suitable combination of components implements the disclosed embodiments.

The memory 860 comprises one or more disks, tape drives, or solid-state drives. The device 800 may use the memory 860 as an over-flow data storage device to store programs when the device 800 selects those programs for execution and to store instructions and data that the device 800 reads during execution of those programs. The memory 860 may be volatile or non-volatile and may be any combination of ROM, RAM, TCAM, or SRAM.

FIG. 9 is a flowchart illustrating a method 900 of L2 mobility according to an embodiment of the disclosure. The UE 505 may perform the method 900. At step 910, an L2 measurement control message is received from a source node. For instance, the UE 505 receives the L2 measurement control message from the source DU 510. At step 920, an L2 measurement report is generated in response to the L2 measurement control message. For instance, the UE 505 generates the L2 measurement report. At step 930, the L2 measurement report is transmitted to the source node. For instance, the UE 505 transmits the L2 measurement report to the source DU 510. Finally, at step 940, a handover from the source node to a target node is performed in response to a handover decision. The handover decision is based on the L2 measurement report. For instance, the CU 520 performs the handover decision and the handover is from the source DU 510 to the target DU 515.

In an example embodiment, a UE comprises: a memory element; and a processor element coupled to the memory element and configured to: wirelessly communicate with a source node, perform a handover from the source node to a target node using layer 2 (L2) signaling in response to a handover decision between the source node and the target node, and wirelessly communicate with the target node in response to the handover.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A user equipment (UE) comprising:
   a memory;
   a processor coupled to the memory and configured to:
   wirelessly communicate with a source node,
   perform a handover from the source node to a target node through L1 signaling or L2 signaling and independent of L3 signaling, and
   wirelessly communicate with the target node in response to the handover; and
   a receiver coupled to the processor and configured to:
   receive an L2 handover command from the source node or the target node, the L2 handover command is configured to trigger the UE to perform the handover through L1 signaling or L2 signaling; and
   receive a random access response (RAR) in response to the target node receiving a preamble, the RAR comprises a new L2 context.

2. The UE of claim 1, wherein the receiver is further configured to receive an L2 measurement control message from the source node, wherein the L2 measurement control message comprises at least one of first media access control (MAC) control elements (CEs) or downlink control information (DCI).

3. The UE of claim 2, wherein the processor is further configured to generate an L2 measurement report in response to the L2 measurement control message, wherein the L2 measurement report comprises at least one of second MAC CEs, uplink control information (UCI), a radio link control (RLC) status, or an encapsulated L3 RRC message, and wherein the UE further comprises a transmitter configured to transmit the L2 measurement report to the source node.

4. The UE of claim 3, wherein the receiver is further configured to further receive the L2 handover command in response to the L2 measurement report, and wherein the L2 handover command is configured to trigger an RLC reset, a MAC reset, a MAC renewal, or an RLC renewal.

5. The UE of claim 4, wherein the processor is further configured to perform a two-step random-access channel (RACH) synchronization with the target node in response to the L2 handover command.

6. The UE of claim 5, wherein the processor is further configured to generate the preamble in response to the L2 handover command, and wherein the transmitter is further configured to transmit the preamble to the target node.

7. The UE of claim 1, wherein the L2 signaling comprises at least one of a measurement control message, a measurement report, the L2 handover command, or a context forwarding message.

8. A method implemented by a user equipment (UE), the method comprising:
   wirelessly communicating with a source node;
   receiving an L2 handover command from the source node or a target node, the L2 handover command is configured to trigger the UE to perform a handover through L1 signaling or L2 signaling;
   performing a two-step random-access channel (RACH) synchronization with the target node in response to the L2 handover command;
   performing the handover from the source node to the target node through L1 signaling or L2 signaling and independent of L3 signaling; and
   wirelessly communicating with the target node in response to the handover.

9. The method of claim 8, further comprising transmitting first uplink (UL) reference signals to the source node.

10. The method of claim 9, further comprising transmitting second UL reference signals to the target node.

11. The method of claim 10, further comprising further receiving the L2 handover command in response to an uplink (UL) measurement report, wherein the L2 handover command is configured to trigger a radio link control (RLC) reset, a medium access control (MAC) reset, a MAC renewal, or an RLC renewal.

12. The method of claim 11, further comprising further performing the handover in response to the L2 handover command, wherein the L2 handover command comprises at least one of medium access control (MAC) control elements (CEs), downlink control information (DCI) or an encapsulated L3 Radio Resource Control (RRC) message.

13. The method of claim 8, wherein the source node is a source distributed unit (DU), wherein the target node is a target DU, and wherein the method further comprises further performing the handover in response to a handover decision originating from a central unit (CU).

14. A method implemented by a user equipment (UE), the method comprising:
   receiving an L2 measurement control message from a source node;
   generating an L2 measurement report in response to the L2 measurement control message;
   transmitting the L2 measurement report to the source node;
   receiving an L2 handover command from the source node or a target node, the L2 handover command is configured to trigger the UE to perform a handover through L1 signaling or L2 signaling;
   generating a preamble in response to the L2 handover command;
   transmitting the preamble to the target node; and
   performing the handover from the source node to the target node in response to the L2 handover command and a handover decision, through L1 or L2 signaling, and independent of L3 signaling,
   the handover decision based on the L2 measurement report.

15. The method of claim 14, wherein all messages with the source node and the target node in the handover are through L1 signaling or L2 signaling.

16. The method of claim 14, further comprising further receiving the L2 handover command through L2 signaling and independent of L3 signaling.

17. The method of claim 14, further comprising further performing the handover independent of L3 signaling.

18. The UE of claim 1, wherein the receiver is further configured to further receive the L2 handover command through L2 signaling and independent of L3 signaling.

19. The method of claim 8, further comprising further receiving the L2 handover command through L2 signaling and independent of L3 signaling.

20. A system comprising:
   a target node;
   a central unit (CU); and
   a source node comprising:
      a processor configured to generate an L2 handover command, the L2 handover command is configured to trigger a user equipment (UE) to perform a handover from the source node to the target node through L1 signaling or L2 signaling, and
      a transmitter coupled to the processor and configured to transmit the L2 handover command to the UE,
      the processor is further configured to facilitate the handover of the UE along with the CU through L1 signaling or L2 signaling and independent of L3 signaling,
      the source node is at least one of a distributed unit (DU) or a transmission and reception point (TRP).

21. The system of claim 20, wherein the target node is at least one of a distributed unit (DU) or a transmission and reception point (TRP).

* * * * *